United States Patent

Meehan

Patent Number: 5,440,869
Date of Patent: Aug. 15, 1995

[54] WEED REMOVAL RAKES

[76] Inventor: Nancy E. Meehan, Box 430 RRI, Woodland, Me. 04694

[21] Appl. No.: 314,099

[22] Filed: Sep. 28, 1994

[51] Int. Cl.⁶ .......................... A01D 7/02; A01D 7/06
[52] U.S. Cl. .................................. 56/400.21; 172/380
[58] Field of Search ............ 56/400.21, 400.16, 400.17, 56/400.01, 400.04; 172/380, 378

[56] References Cited

U.S. PATENT DOCUMENTS

| | | | |
|---|---|---|---|
| 538,146 | 4/1895 | Bailey | 56/400.06 X |
| 838,417 | 12/1906 | Jenkins | 172/380 |
| 1,089,542 | 3/1914 | Erwin | 56/400.07 |
| 1,352,386 | 9/1920 | Rundberg | 56/400.16 X |
| 1,666,374 | 4/1928 | Gatti | 172/380 X |
| 2,010,303 | 8/1935 | Hopley | 172/380 |
| 2,395,111 | 2/1946 | Friedheim | 56/400.07 |
| 4,435,951 | 3/1984 | Dambroth | 56/400.21 X |
| 5,097,910 | 3/1992 | Traczek | 172/375 |
| 5,142,855 | 9/1992 | Guidarelli | 56/400.21 X |
| 5,234,241 | 8/1993 | Ikerd | 294/50.8 |

FOREIGN PATENT DOCUMENTS 670870  9/1963  Canada .............................. 172/380

Primary Examiner—Stephen J. Novosad

[57] ABSTRACT

A weed removal rake comprising: a blade in a generally planar rectangular configuration with an upper region, a lower region, a central region therebetween, the upper region including a hollow handle retainer extending rearwardly therefrom, the lower region formed of a plurality of equidistantly spaced tines, the tines being formed contiguously with the central region and shaped in a rectangular configuration, a plurality of inner tines including two sharp side edges, each end of the blade including an end tine with a sharp inner edge and a dull outer edge, the central region of the blade formed as a planar rectangular member with a series of apertures with openings formed contiguously with the spaces between the tines, the edges of the apertures being sharp; and a handle having an inboard end and an outboard end, the inboard end adapted to be tightly coupled within the retainer handle of the blade in the operative orientation.

5 Claims, 4 Drawing Sheets

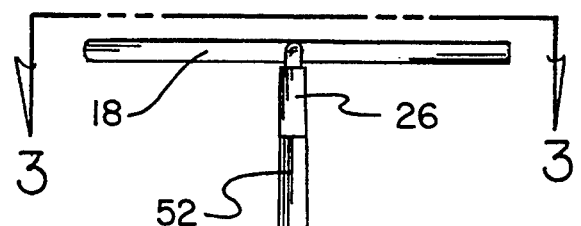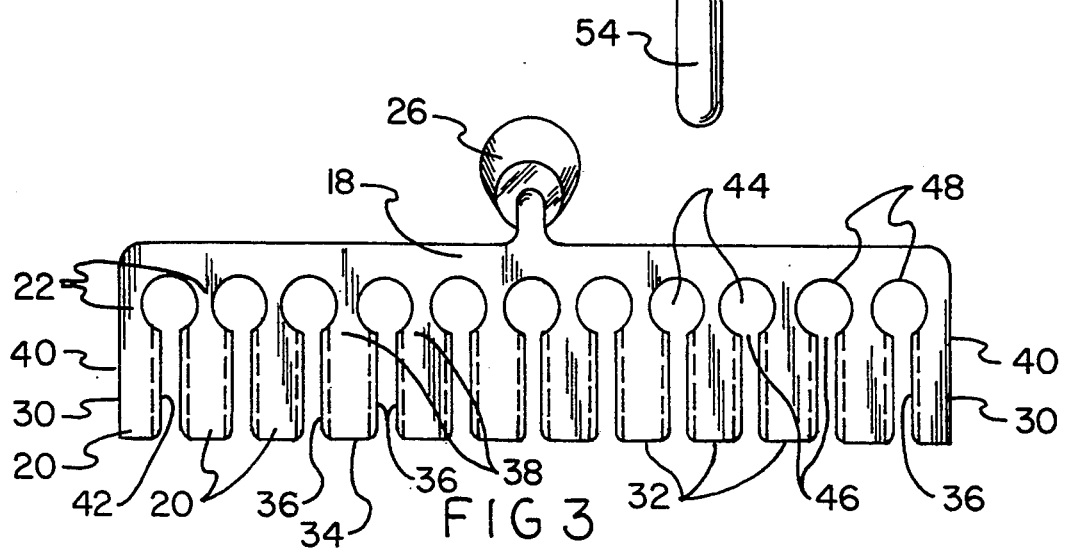

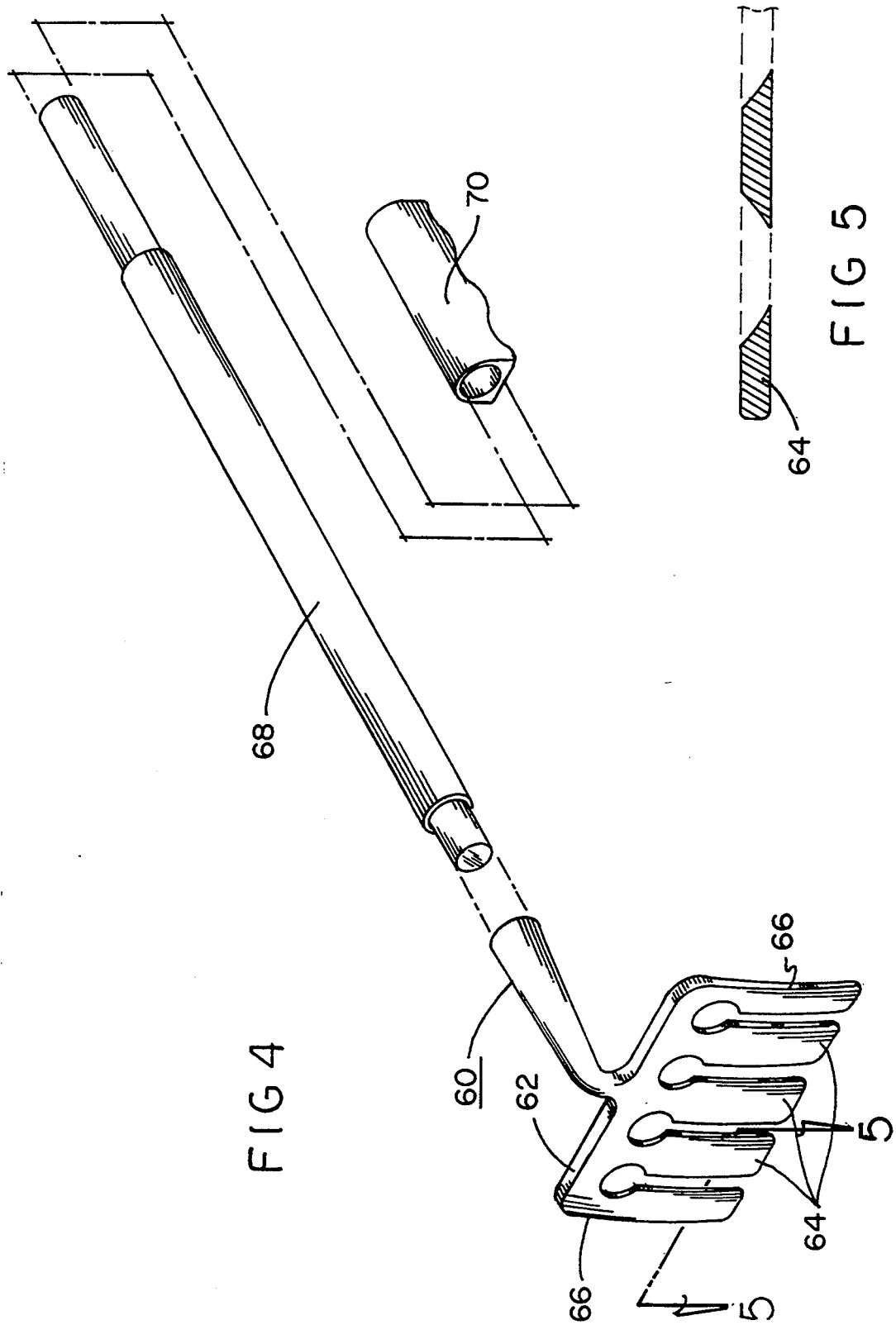

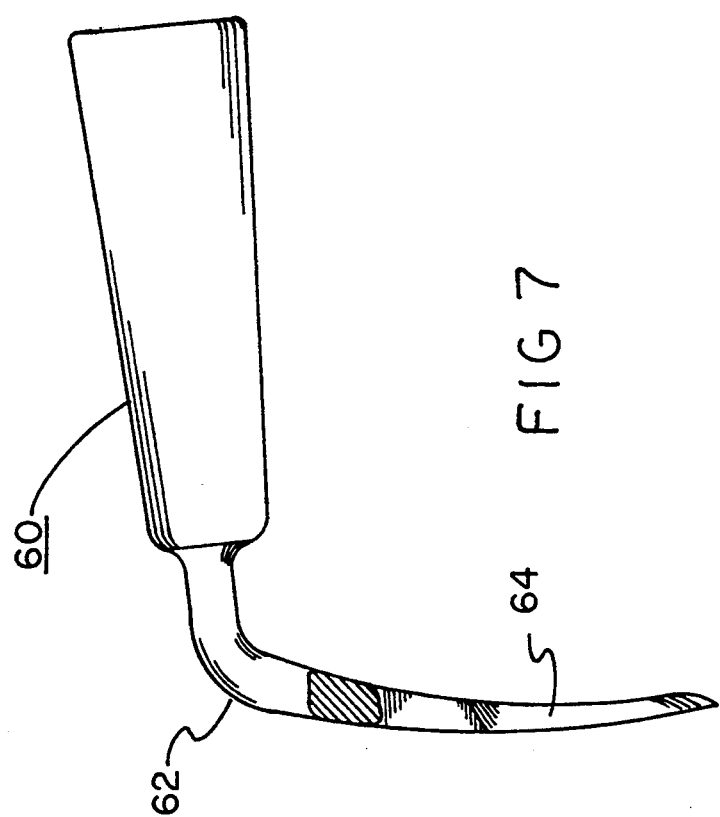
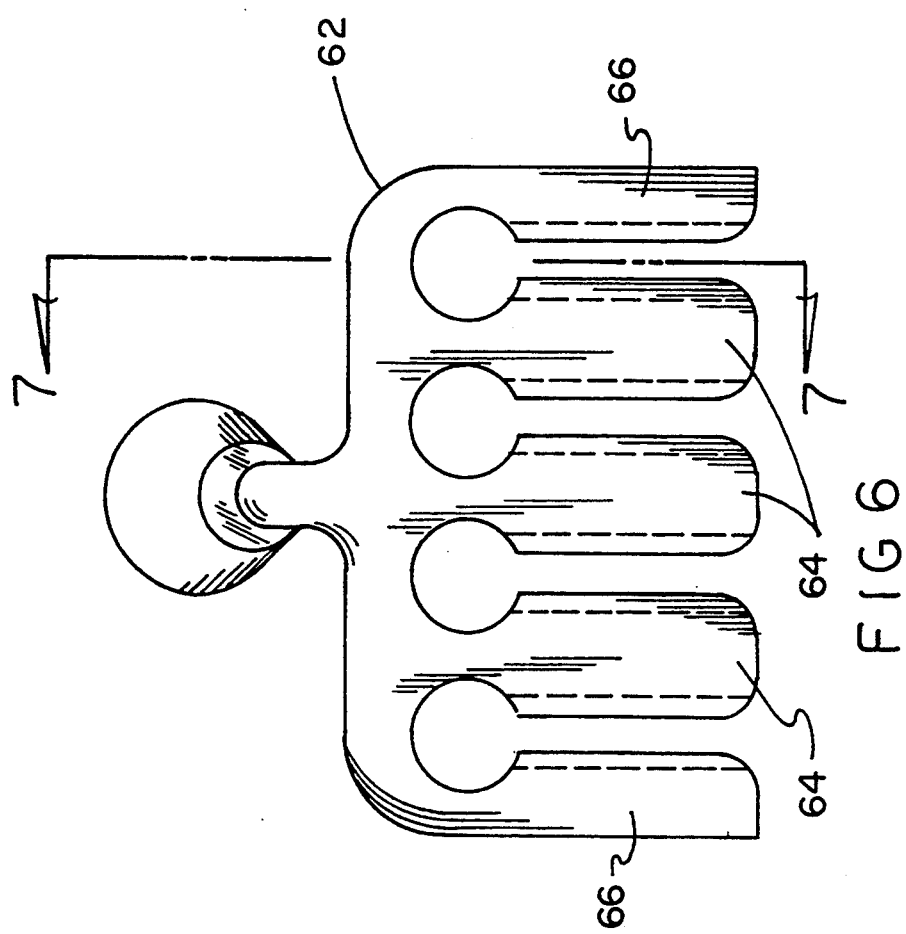

WEED REMOVAL RAKES

BACKGROUND OF THE INVENTION

1. Field of the Invention

The present invention relates to weed removal rakes and more particularly pertains to removing large quantities of weeds by pulling the sharp tines of the rakes through the leaves and stems of heavily weeded areas.

2. Description of the Prior Art

The use of devices for removing weeds is known in the prior art. More specifically, devices for removing weeds heretofore devised and utilized for the purpose of removing small quantities of weeds by applying direct pressure to the specific area of the weed patch are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,234,241 to Ikerd a weed remover.

U.S. Pat. No. 4,515,223 to Erickson discloses a hand operated weeding device with operating depth stabilizer plate and weed displacer strip.

U.S. Pat. No. 5,097,910 to Traczek discloses a weed cutting tool.

U.S. Pat. No. 4,832,132, to Barcelon discloses a hand weeder.

Lastly, U.S. Pat. No. Des. 250,569 to Smith discloses a handle support for weed cutting implements.

In this respect, the weed removal rakes according to the present invention substantially depart from the conventional concepts and designs of the prior art, and in doing so provides an apparatus primarily developed for the purpose of removing large quantities of weeds by pulling the sharp tines of the rakes through the leaves and stems of heavily weeded areas.

Therefore, it can be appreciated that there exists a continuing need for new and improved weed removal rakes which can be used for removing large quantities of weeds by pulling the sharp tines of the rakes through the leaves and stems of heavily weeded areas. In this regard, the present invention substantially fulfills this need.

SUMMARY OF THE INVENTION

In view of the foregoing disadvantages inherent in the known types of devices for removing weeds now present in the prior art, the present invention provides improved weed removal rakes. As such, the general purpose of the present invention, which will be described subsequently in greater detail, is to provide new and improved weed removal rakes and method which has all the advantages of the prior art and none of the disadvantages.

To attain this, the present invention essentially comprises a new and improved weed removal rake comprising, in combination: a blade fabricated of steel and formed in a generally planar rectangular configuration, the blade having an upper region a lower region, a central region therebetween, a front face and a rear face, the plane of the blade having a slight bend forming a slightly concave shape with respect to its rear face, the upper region of the blade being formed in a solid generally rectangular configuration, the center point of the upper region of the blade including a hollow generally cylindrical shaped handle retainer extending rearwardly therefrom, the end of the handle retainer in contact with the blade having a smaller diameter than the opposite end with a gradually increasing diameter therebetween; the blade having a lower region formed of a series of between about ten and fifteen equidistantly spaced tines, each tine being formed in a generally rectangular configuration with a lower edge, two side edges, and an upper edge formed contiguously with the central region, the blade including a plurality of inner tines each having two razor sharp side edges, the blade including an end tine at each of its respective ends, the end tines having about one half the width of the inner tines and including a dull outboard side edge and a razor sharp inboard side edge, the central region of the blade formed as a generally planar rectangular member with a series of equidistantly spaced generally circular shaped apertures with openings at their lowermost extents, the openings being formed contiguously with the openings between the tines of the lower region, the edges of the circular shaped apertures being razor sharp, the sharp edges of the tines and circular apertures adapted to snare and remove weeds when pulled through a weeded area; and a handle fabricated of wood and formed in a solid generally cylindrical configuration with an inboard end and an outboard end, the inboard end having a smaller diameter than the outboard end with a gradually increasing diameter therebetween, the inboard end having a flat end at its furthest extent and adapted to be tightly coupled within the retainer handle of the blade in the operative orientation, the outboard end of the blade being rounded at its furthest extent, the gradually increasing diameter of the handle providing a secure gripping surface for the user in the operative orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved weed removal rakes which have all the advantages of the prior art devices for removing weeds and none of the disadvantages.

It is another object of the present invention to provide new and improved weed removal rakes which may be easily and efficiently manufactured and marketed.

It is further object of the present invention to provide new and improved weed removal rakes which are of durable and reliable constructions.

An even further object of the present invention is to provide new and improved weed removal rakes which are susceptible of a low cost of manufacture with regard to both materials and labor, and which accordingly are then susceptible of low prices of sale to the consuming public, thereby making such weed removal rakes economically available to the buying public.

Still yet another object of the present invention is to provide new and improved weed removal rakes which provide in the apparatuses and methods of the prior art some of the advantages thereof, while simultaneously overcoming some of the disadvantages normally associated therewith.

Still another object of the present invention is to remove large quantities of weeds by pulling the sharp tines of the rakes through the leaves and stems of heavily weeded areas.

Lastly, it is an object of the present invention to provide new and improved weed removal rake comprising: a blade in a generally planar rectangular configuration with an upper region, a lower region, a central region therebetween, the upper region including a hollow handle retainer extending rearwardly therefrom, the lower region formed of a plurality of equidistantly spaced tines, the tines being formed contiguously with the central region and shaped in a rectangular configuration, a plurality of inner tines including two sharp side edges, each end of the blade including an end tine with a sharp inner edge and a dull outer edge, the central region of the blade formed as a planar rectangular member with a series of apertures with openings formed contiguously with the spaces between the tines, the edges of the apertures being sharp; and a handle having an inboard end and an outboard end, the inboard end adapted to be tightly coupled within the retainer handle of the blade in the operative orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top plan view of the weed removal rake shown in FIG. 1.

FIG. 3 is a separated front perspective view of the blade of the weed removal rake.

FIG. 4 is a separated perspective view of an alternative embodiment of the weed removal rake.

FIG. 5 is a cross sectional view of the alternative embodiment of the weed removal rake taken along line 5—5 of FIG. 4.

FIG. 6 is a isolated front perspective view of the blade of the weed removal rake.

FIG. 7 is a side cross sectional view of the blade of the alternative embodiment taken along line 7—7 of FIG. 6.

The same reference numerals refer to the same parts through the various Figures.

DESCRIPTION OF THE PREFERRED EMBODIMENT

Figure 1:
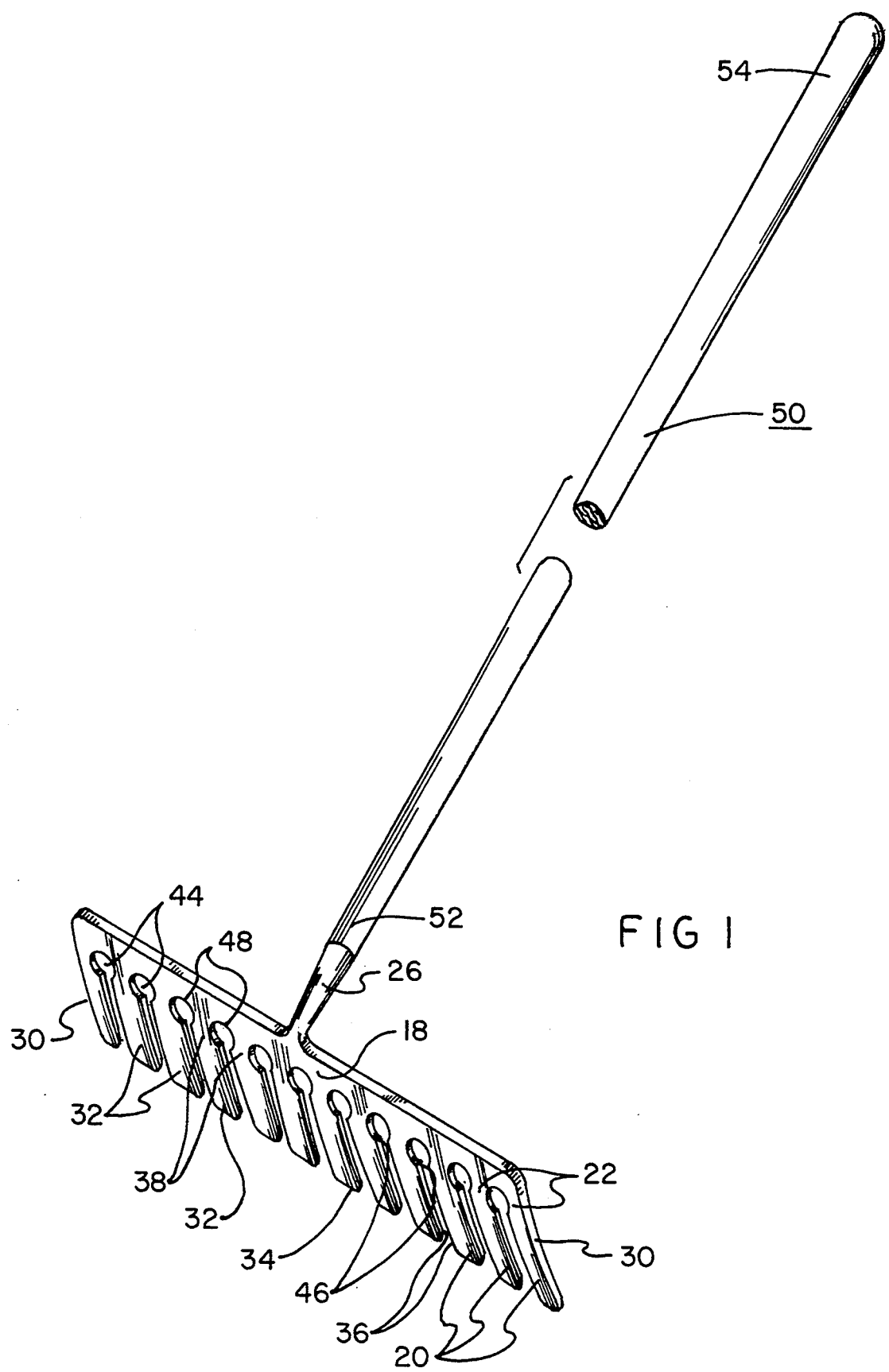
FIG. 1 is a perspective view of the preferred embodiment of the weed removal rake constructed in accordance with the principles of the present invention.

With reference now to the drawings, and in particular to FIG. 1 thereof, the preferred embodiment of the new and improved weed removal rake embodying the principles and concepts of the present invention and generally designated by the reference numeral 10 will be described.

The present invention, the weed removal rake 10 is comprised of a plurality of components. Such components in their broadest context include a blade 12, and a handle 14.

More specifically, the blade 12 is fabricated of steel and formed in a generally planar rectangular configuration. The sturdy construction of the blade reduces the possibility of the tines breaking off during use. The blade has an upper region 18, a lower region 20 and a central region 22 therebetween. The blade also has a front face and a rear face. The plane of the blade has a slight bend which forms a slightly concave shape with respect to its rear face. The concave shape enhances the utility of the rake in snaring weeds. Note FIG. 1.

The upper region 18 of the blade is formed in a solid generally rectangular configuration. The center point of the upper region of the blade includes a hollow, generally cylindrical shaped handle retainer 26 which extends rearwardly therefrom. The handle retainer is also made of steel and is formed contiguously with the blade. The end of the handle retainer which is in contact with the blade has a smaller diameter than the opposite end, with a gradually increasing diameter therebetween. The retainer is adapted to securely receive and retain a handle in the operative orientation. Note FIGS. 1 and 2.

The blade 12 has a lower region 20 which is formed of a series of between about ten and fifteen equidistantly spaced tines 30, 32. Each tine is formed in a generally rectangular configuration with a lower edge 34, two side edges 36, and an upper edge 38 which is formed contiguously with the central region 22. The structure of the blade provides strength and durability to the apparatus. The blade includes a plurality of inner tines 32. Each inner tine has two razor sharp side edges 36. The blade includes an end tine 30 at each of its respective ends. The end tines have about one-half the width of the inner tines. The end tines include a dull outboard side edge 40 and a razor sharp inboard side edge 36. The dull outboard edge is a safety precaution to help prevent injury to the user. The sharp inner edges of the tines are adapted to firmly grab weeds. Once the weeds have been grabbed, the user may cut them with the sharp tines or pull them out of the soil. Note FIGS. 1 and 3.

The central region 22 of the blade is formed as a generally planar rectangular member with a series of equidistantly spaced, generally circular shaped apertures 44. The apertures have openings 46 at their lowermost extents. The openings are formed contiguously with the spaces between the tines of the lower region. Together the apertures and spaces between the tines form a series of key hole shaped openings. The edges 48 of the circular shaped apertures are razor sharp. The sharp edges of the tines and circular apertures are adapted to snare and remove weeds when pulled through a weeded area. The weeds become snared within the key hole shaped openings as the rake is pulled through the weeded area. Note FIGS. 1 and 3.

A handle 50 is fabricated of wood and formed in a solid, generally cylindrical configuration with an inboard end 52 and an outboard end 54. The wood construction provides a sturdy and reliable gripping surface. Note FIG. 1. The inboard end has a smaller diameter than the outboard end with a gradually increasing diameter therebetween. The inboard end has a flat end at its furthest extent and is adapted to be tightly coupled within the retainer handle of the blade in the operative orientation. The outboard end of the blade is rounded at its furthest extent to help prevent injury to the user. The gradually increasing diameter of the handle provides a secure gripping surface for the user when utilizing the apparatus. The solid wood construction permits flexible bending of the handle when utilizing the apparatus. Note FIGS. 2 and 3.

An alternative embodiment 60 of the apparatus is shown in FIGS. 4 through 7. In this embodiment the blade 62 of the rake includes between about two and seven inner tines 64 and two end tines 66. In such embodiment the handle 68 is between about six and eighteen inches in length. Additionally, the handle includes a releasably coupled rubber hand grip 70 on its outboard end. This much smaller embodiment of the apparatus provides the user with a compact weed puller which includes many of the features of the primary embodiment. The smaller alternative embodiment of the weed removal rake is ideal for use in flower beds, around shrubbery, and other small areas. Note FIGS. 4 through 7.

The weed removal rake is specifically designed to cut and remove weeds. The tool resembles a standard lawn and garden rake and consists of a handle and a blade. The handle is made of wood and is approximately the size of a broom handle. A series of tines run the entire length of the blade. The tines are separated by circular apertures measuring approximately three quarters of an inch in diameter. The apertures include a one-quarter inch circular opening with a tine extending out from either side of the opening. The side edges of each tine is razor sharp. The tines are positioned on the blade closer together than those on an ordinary rake. In an alternative embodiment of the apparatus the rake is made with a shorter handle and blade for use in flower beds, around shrubbery, etc.

The tool is used much like a traditional garden rake. When it is pulled through weeds, the tines slide in between the leaves and stems and the weeds get caught in the sharp circular apertures. Once caught in the apparatus the weeds can be easily pulled out of the ground. The weed removal rake is easier and more efficient to use than traditional weeding tools which require chopping, hacking, or digging to remove weeds.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved weed removal rake comprising, in combination:

a blade fabricated of steel and formed in a generally planar rectangular configuration, the blade having an upper region a lower region, a central region therebetween, a front face and a rear face, the plane of the blade having a slight bend forming a slightly concave shape with respect to its rear face, the upper region of the blade being formed in a solid generally rectangular configuration, the center point of the upper region of the blade including a hollow generally cylindrical shaped handle retainer extending rearwardly therefrom, the end of the handle retainer in contact with the blade having a smaller diameter than the opposite end with a gradually increasing diameter therebetween;

the blade having a lower region formed of a series of between about ten and fifteen equidistantly spaced tines, each tine being formed in a generally rectangular configuration with a lower edge, two side edges, and an upper edge formed contiguously with the central region, the blade including a plurality of inner tines each having two razor sharp side edges, the blade including an end tine at each of its respective ends, the end tines having about one half the width of the inner tines and including a dull outboard side edge and a razor sharp inboard side edge, the central region of the blade formed as a generally planar rectangular member with a series of equidistantly spaced generally circular shaped apertures with openings at their lowermost extents, the openings being formed contiguously with the openings between the tines of the lower region, the edges of the circular shaped apertures being razor sharp, the sharp edges of the tines and circular apertures adapted to snare and remove weeds when pulled through a weeded area; and a handle fabricated of wood and formed in a solid generally cylindrical configuration with an inboard end and an outboard end, the inboard end having a smaller diameter than the outboard end with a gradually increasing diameter therebetween, the inboard end having a flat end at its furthest extent and adapted to be tightly coupled within the retainer handle of the blade in the operative orientation, the outboard end of the blade being rounded at its furthest extent, the gradually increasing diameter of the handle providing a secure gripping surface for the user when utilizing the apparatus.

2. A weed removal rake comprising:

a blade in a generally planar rectangular configuration with an upper region, a lower region, a central region therebetween, the upper region including a hollow handle retainer extending rearwardly therefrom, the lower region formed of a plurality of equidistantly spaced tines, the tines being formed contiguously with the central region and shaped in a rectangular configuration, a plurality of inner tines including two sharp side edges, each end of the blade including an end tine with a sharp inner edge and a dull outer edge, the central region of the blade formed as a planar rectangular member with a series of apertures with openings formed contiguously with the spaces between the tines, the edges of the apertures being sharp; and a handle having an inboard end and an outboard end, the inboard end adapted to be tightly coupled within the retainer handle of the blade in the operative orientation.

3. The apparatus as set forth in claim 2 wherein the blade of the rake includes between about eight and twenty inner tines and the handle is between about two and four feet in length.

4. The apparatus as set forth in claim 2 wherein the blade of the rake includes between about two and seven inner tines and the handle is between about six and eighteen inches in length.

5. The apparatus as set forth in claim 4 wherein the handle includes a releasably coupled rubber hand grip on its outboard end.

* * * * *